United States Patent [19]

Hinn et al.

[11] 4,233,624
[45] Nov. 11, 1980

[54] COMBINED KINESCOPE GRID AND CATHODE VIDEO DRIVE SYSTEM

[75] Inventors: Werner Hinn, Zollikerberg; Jürg Hinderling, Winterthur, both of Switzerland

[73] Assignee: RCA Corporation, New York, N.Y.

[21] Appl. No.: 53,908

[22] Filed: Jul. 2, 1979

[30] Foreign Application Priority Data

Jul. 6, 1978 [GB] United Kingdom ............... 29089/78

[51] Int. Cl.³ .............................................. H04N 9/20
[52] U.S. Cl. ....................................................... 358/65
[58] Field of Search ..................... 358/64, 65, 66, 30

[56] References Cited

U.S. PATENT DOCUMENTS

| 2,867,751 | 1/1959 | Tourshou et al. | |
|---|---|---|---|
| 2,920,189 | 1/1960 | Holmes. | |
| 3,663,745 | 5/1972 | O'Toole | 358/30 |

*Primary Examiner*—Richard Murray
*Attorney, Agent, or Firm*—Eugene M. Whitacre; William H. Meagher; Ronald H. Kurdyla

[57] ABSTRACT

In a color television receiver including a color image reproducing kinescope with plural cathode electrodes and a common grid electrode, a kinescope driver amplifier arrangement is disclosed for supplying frequency selective video signal drive to the kinescope. The receiver also includes networks for providing wide bandwidth luminance (Y) and plural color (r, g, b) image representative signals containing low and high frequency components, as derived from a composite color television signal. High frequency components (e.g., derived from the luminance signal) above a prescribed frequency are selectively processed in a grid signal path and supplied to the kinescope grid via a grid driver amplifier stage. A high frequency compensation signal derived from the grid signal is combined with each of the plural color signals with a sense to cancel with the high frequency components of the color signals. The plural color signals with remaining low frequency components below the prescribed frequency are respectively supplied to the plural kinescope cathodes via plural cathode driver amplifier stages. With this arrangement, full wide bandwidth signal drive is supplied to the kinescope, while the cathode driver stages employ an economical number of inexpensive, low power consumption active devices.

13 Claims, 7 Drawing Figures

COMBINED KINESCOPE GRID AND CATHODE VIDEO DRIVE SYSTEM

This invention relates to an economical, low power consumption kinescope driver amplifier arrangement suitable for supplying amplified video signals to an image reproducing kinescope of a color television receiver or equivalent system.

In the case of a conventional color television receiver, three kinescope driver stages are typically employed to respectively supply wide bandwidth, high level red, green and blue color image representative signals including low and high frequency components to individual intensity control electrodes of a color kinescope. Each of such driver stages when employing a Class A amplifier for amplifying wide bandwidth video signals can consume considerable amounts of power (e.g., up to six watts per amplifier stage). Relatively less power is consumed by a driver amplifier arranged in a complementary or quasicomplementary configuration, which requires two high voltage transistors. The advantages of a complementary amplifier configuration relative to a Class A amplifier configuration include low power consumption and greater signal processing bandwidth. However, a complementary driver amplifier system requires a total of six high voltage transistors and exhibits greater sensitivity to kinescope "flashovers." Also, undesirable differential signal rise time errors may also be produced. These errors appear as differences in the high frequency amplitude response among the driver stages, and are associated with fast signal amplitude transitions (e.g., color edge transitions) and high frequency bursts, for example, particularly when the driver stages are arranged to exhibit different operating points.

In accordance with the principles of the present invention, a kinescope driver amplifier arrangement as described herein desirably requires a minimum of high power dissipation transistors, exhibits low sensitivity to kinescope "flashovers" and minimizes high frequency differential rise time errors, while maintaining a wide bandwidth capability and low power consumption.

A kinescope driver amplifier arrangement according to the present invention is included in a system for processing a color image representative video signal containing low and high frequency components. The system includes a kinescope having an electron gun assembly comprising first and second intensity control electrodes for reproducing an image in response to video signals applied to the control electrodes. High frequency components of the video signal above a given frequency are selectively passed to a first amplifier which supplies amplified, selected high frequency components to the first kinescope electrode. The selected high frequency components and the color representative video signal including low and high frequency components are combined in a combining network with a sense to significantly attenuate the high frequency component of the video signal at an output of the combining network. A second amplifier supplies an amplified version of the output signals from the combining network to the second kinescope electrode.

In accordance with a feature of the invention, a gain control network is included for adjustably controlling the amplitude of the color signal combined by the combining network. The gain control network is adjustable to a position for producing a controlled amplitude color signal at the input of the combining network, to cancel the selected high frequency component at the output of the combining network.

Figure 1:
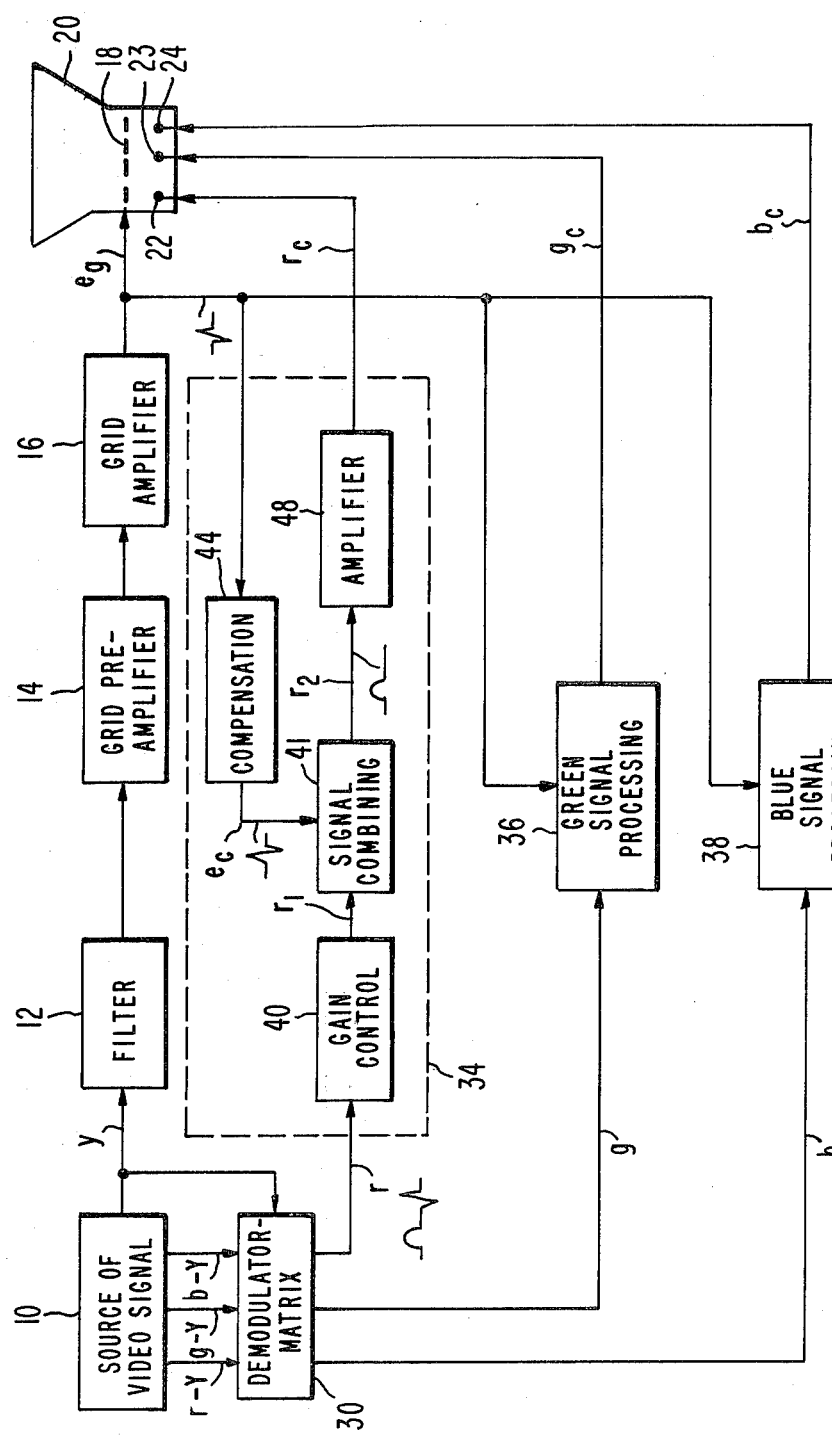
FIG. 1 shows a block diagram of a portion of a color television receiver including a kinescope driver arrangement according to the present invention.

In FIG. 1, a source of video signals 10, including luminance and chrominance signal processing networks, provides a wide bandwidth luminance signal Y containing high frequency video signal information, and r-y, g-y and b-y color difference signals. The luminance signal from source 10 is filtered by a high pass filter 12 to remove low frequency signal components below a predetermined cut-off frequency $f_c$, as will be discussed. Selectively passed high requency components from filter 12 are successively amplified by a grid preamplifier stage 14 and a grid amplifier stage 16. An amplified grid drive output signal $e_g$ from amplifier 16 is applied to a control grid electrode 18 of a color kinescope 20. In this example, kinescope 20 corresponds to a kinescope of the self-converging "in-line" type, with rid electrode 18 being a single grid common to each of the kinescope electron guns comprising cathodes 22, 23 and 24.

The luminance signal and the color difference signals from source 10 are combined in a demodulator-matrix 30 for providing r, g and b color image representative signals, which contain low frequency signal information as well as the high frequency luminance signal information associated with the luminance output signal from source 10. The color signals are respectively translated by red, green and blue color signal processing units 34, 36 and 38 for providing amplified color signals $r_c$, $g_c$ and $b_c$ which are respectively applied to cathodes 22, 23 and 24 of kinescope 20. Each of signal processing units 34, 36 and 38 also receives an input high frequency signal derived from grid drive signal $e_g$ at the output of amplifier stage 16. Signal processing units 34, 36 and 38 are of similar configuration in this example. Accordingly, the following discussion of the operation of red signal processing unit 34 also applies to green and blue signal processing units 36 and 38.

Referring to red signal processor 34, the peak to peak amplitude of the red (r) signal from source 30 is controlled by a gain control unit 40. Control 40 corresponds to a "white balance" control which is adjusted during kinescope set-up in a service mode of the receiver to compensate for differences in the phosphor efficiencies of the kinescope, for example. An output signal $r_1$ from control unit 40 is supplied to a first input of a signal combining network 41. A second input of network 41 receives a high frequency compensation signal $e_c$ which is derived from high frequency signal $e_g$ via a compensation network 44.

Compensation network 44 includes appropriate signal translating and signal inversion circuits such that output signal $e_c$ corresponds to a complementary phase version of high frequency grid signal $e_g$. The high frequency signal components which are common to grid signal $e_g$ and color signals r, $r_1$ are cancelled in whole or in significant part by means of a signal subtraction process when complementary signals $r_1$ and $e_c$ are combined in unit 41. Complete signal cancellation occurs when gain control unit 40 is adjusted so that the amplitudes of combined signals $r_1$ and $e_c$ are equal, as will be explained subsequently. A resulting output signal $r_2$ from combiner 41 is afterwards amplified by a signal inverting amplifier 48 to produce a red signal $r_c$ for driving red cathode 22 of kinescope 20.

Depending upon the gain setting of control unit 40, the high frequency component of signal r is either completely cancelled by compensation signal $e_c$, in which case signal $r_2$ substantially consists of only low frequency video signal components below frequency $f_c$, or cancelled in significant part by signal $e_c$, in which case signal $r_2$ consists of low frequency components plus a small amount of residual high frequency signal. Cathode signal amplifier 48 therefore need not be capable of accommodating large amplitude high frequency signals. Thus, for example, amplifier 48 may comprise a low-current Class A amplifier with a relatively limited output slewing rate capability, while still retaining a 5 MHz bandwidth for small signals. Such a bandwidth can be achieved by means of a suitable R-C frequency compensation network as will be described in connection with the circuit of FIG. 7.

The results of the signal cancellation process mentioned above are illustrated by the normalized amplitude signal waveforms shown in FIGS. 2–6. The following discussion of these waveforms with respect to the red cathode signal also applies to the green and blue cathode signals.

Figure 2:
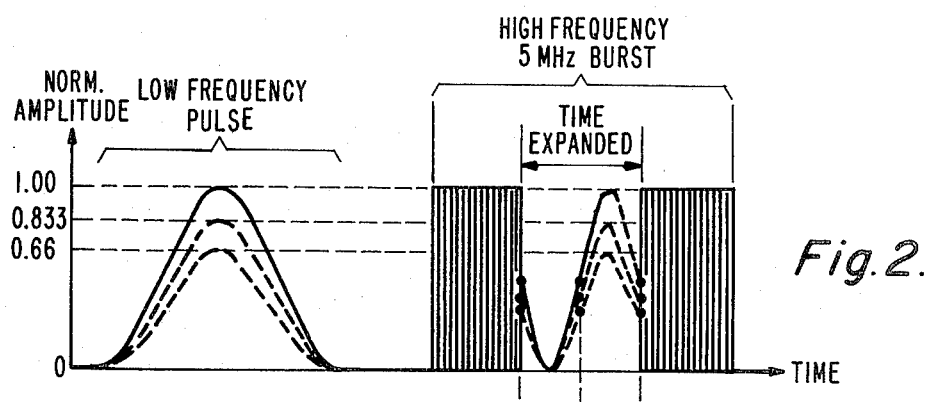
FIGS. 2–6 depict signal waveforms useful in understanding the operation of the arrangement shown in FIG. 1.
Figure 3:
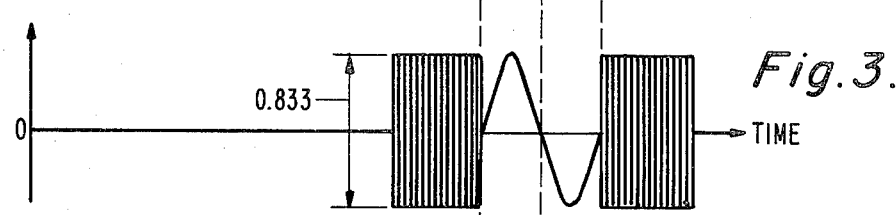

In FIG. 2, signal $r_1$ is shown for various gain settings of control unit 40 and includes a low frequency pulse, and a high frequency (5 MHz) signal burst including a time expanded segment shown to clarify the subtractive signal cancellation process for high frequency signal components. Signal $e_c$ is shown in FIG. 3 and contains only the high frequency signal components due to the filtering action of filter 12. The amplitude of signal $e_c$ is unaffected by adjustment of gain control unit 40, and is symmetrical about a D.C. reference level of zero volts in this instance.

Figure 5:
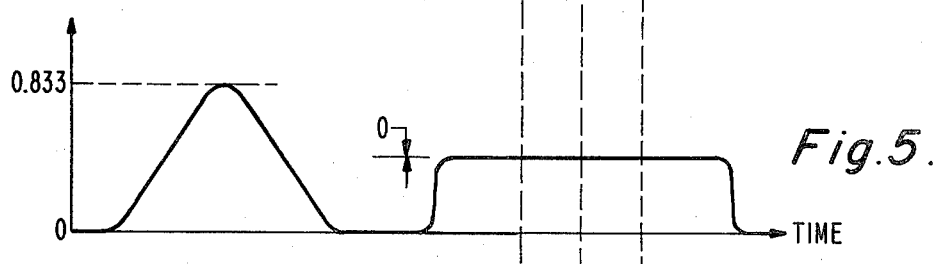

FIG. 5 shows signal $r_2$ when gain control unit 40 is at a mid-gain setting. This setting produces a normalized signal amplitude of 0.833 relative to the normalized signal amplitude of 1.00 at a maximum gain setting of control 40. For this condition, signal $r_2$ does not include high frequency components, since the high frequency components of signals $e_c$ and $r_1$ are equal (0.833 normalized amplitude) and mutually cancel when combined in combiner 41.

Figure 4:
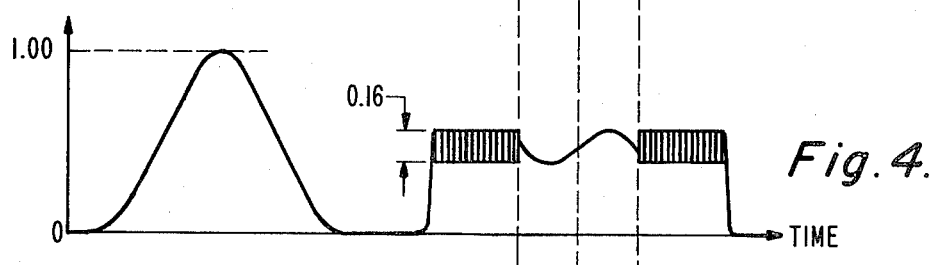
Figure 6:
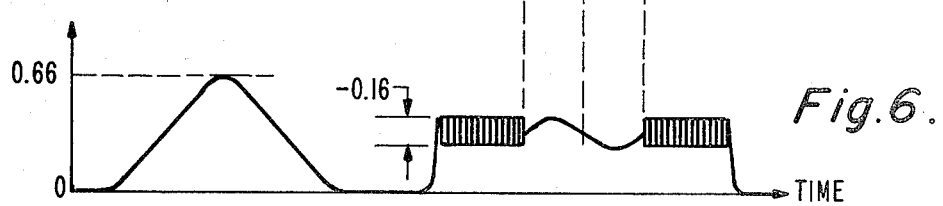

Combined signals $e_c$ and $r_1$ exhibit high frequency components of unequal amplitude when control 40 is at the maximum setting (1.00 normalized amplitude) and the minimum gain setting (0.66 normalized amplitude). Consequently, a small uncancelled residual high frequency component of 0.16 normalized amplitude (1.00−0.833 normalized amplitude) and of one phase appears in signal $r_2$ at the maximum gain setting, as shown in FIG. 4. Also, a small uncancelled residual high frequency component of −0.16 normalized amplitude (0.66−0.833 normalized amplitude) appears in signal $r_2$ at the minimum gain setting, as shown in FIG. 6. The phase of this residual component is the opposite of the phase of the residual component produced when control 40 is at the maximum gain setting. Signals of this type are easily accommodated by Class A amplifiers biased for low current operation. For the described normalized amplitude gain adjustment range of 0.66 to 1.00, as often required in the case of "in-line" type kinescopes, the residual high frequency components will not exceed sixteen percent of the maximum amplitude of the low frequency component.

Separation of the high and low frequency kinescope drive signal components by means of the described signal cancellation technique provides several advantages compared to other signal separation techniques employing high-pass and low-pass filtering, for example.

Close tracking between high frequency and low frequency signal gain is obtained even though the red, blue and green signal processing gains are adjusted only in the cathode signal processing paths. Considering the red (r) signal processing path including unit 34, for example, the kinescope drive signal $(r_c − e_g)$ which determines the beam current of the red kinescope electron gun is directly proportional to the level of input red signal r according to the expression:

$$(r_c - e_g) = -rA_{40}A_{48}.$$

The gain provided by gain control unit 40 ($A_{40}$) and the gain associated with amplified 48 ($A_{48}$) alone determine the signal gain to be exhibited for the red signal processing path. It can be shown mathematically that the above expression is satisfied when the gain of compensation unit 44 equals $1/A_{48}$. When this condition exists, the high frequency signals are cancelled in whole or in significant part in the r signal processing path as discussed above, while appropriate high frequency video signal drive via filter 12 and amplifier 16 is applied to kinescope grid 18.

The kinescope drive signal $(r_c − e_g)$ is an amplified replica of input signal r for all settings of gain control 40 when the gain of the compensation signal path including unit 44 is established as noted above. Illustratively, a residual high frequency signal appears in the red cathode signal when gain control unit 40 is set at a minimum gain position, for attenuating the r cathode signal (see FIG. 6). The gain of the high frequency grid signal is effectively attenuated a corresponding amount, since the residual high frequency component of the r cathode signal is of a sense to oppose the effects of the grid signal by an amount corresponding to the magnitude of the residual high frequency cathode signal component. Specifically, the magnitude and polarity of this residual high frequency component (as derived from the output of combiner 41 and after inversion by inverting amplifier 48) are such as to oppose additional kinescope current conduction in response to the applied high frequency grid and cathode signals. The kinescope grid and cathode receive high frequency signals of the same polarity in this case. Similarly, the magnitude and polarity of the residual high frequency component produced at the maximum gain setting of control 40 are such as to induce additional kinescope current conduction in response to the applied grid and cathode signals. The kinescope grid and cathode receive high frequency signals of mutually opposite polarity in this instance. Thus, the high frequency signal drive to the kinescope tracks with the low frequency signal drive as gain control 40 is adjusted in the cathode signal path.

As stated previously, the kinescope drive signal which determines the beam current of the red electron gun is directly proportional to and an amplified replica of red signal r. Thus, there is no net modulation of the kinescope red electron gun (comprising grid 18 and cathode 22) by the high frequency signal from grid amplifier 16. This effect can be seen as follows, assuming for the moment that red signal r is removed. The high frequency signal applied to grid 18 with a nominal phase is inverted in phase by compensation network 44, appears at the output of combiner 41, and is gain inverted in phase by inverting amplifier 48. This high frequency signal from amplifier 48, as then applied to cathode 22, exhibits the same phase as the signal applied to grid 18. The amplitudes of the grid and cathode signals are also equal, as determined by the gain relationship between unit 44 and amplifier 48 discussed previously. These high frequency grid and cathode signals, being of the same amplitude and polarity, therefore produce no net high frequency modulation of the kinescope red electron gun.

Signals having frequencies which fall onto the slope of the signal transfer characteristic of filter 12 (i.e., in the vicinity of cutoff frequency $f_c$) are partially attenuated by filter 12. However, there is only partial cancellation of these signal frequencies in the r signal processing path, so that both grid 18 and red cathode 22 of kinescope 20 are driven with these signal frequencies. Video signal frequencies significantly below cutoff frequency $f_c$ are attenuated by filter 12 such that kinescope grid 18 receives substantially no video signals within the range of signal frequencies below frequency $f_c$. Thus it is seen that video signal frequency separation provided by the described signal subtraction process also automatically provides appropriate division of the video signal between the kinescope cathodes and grid independent of the operating characteristics and cutoff frequency of high pass filter 12.

The cutoff frequency of high pass filter 12 may be chosen in the range of 200 KHz to one MHz, for example. A cutoff frequency less than or substantially equal to one MHz ensures that signal frequencies above one MHz which are common to be three primary color signals r, g, and b are substantially cancelled prior to being finally amplified by amplifier 48 in processor 34. A cutoff frequency substantially equal to or greater than 200 KHz ensures that the D.C. component of the video signal does not appear at the grid signal amplifier stages and at kinescope grid 18. Also, the described signal cancellation process does not then contribute to the production of color difference signals (r-Y, g-Y, b-Y) in the cathode signal processing paths when the signal from source 10 corresponds to the luminance component (Y) of the video signal, as in this example. Color difference signals at the inputs of the cathode signal amplifiers (e.g., amplifier 48) are undesirable because these signals typically exhibit greater amplitudes compared to primary color signals r, g and b.

It is noted that, in the discussion of FIG. 1, it was assumed that the relative phases of signals $e_g$ and $r_1$ are such that phase inversion of signal $e_g$ by means of an inverter within network 44 was required in order to produce the high frequency components of signals $e_c$ and $r_1$ in complementary phase relation so that these high frequency components cancel when signals $e_c$ and $r_1$ are combined in unit 41. However, if the grid signal from the output of preamplifier 14 exhibits an appropriate phase relative to signal $r_1$, then compensation signal $e_c$ can be derived via network 44 from the output of preamplifier 14 instead of from the output of amplifier 16, without requiring use of a phase inverter within network 44 in order to produce the desired high frequency signal cancellation within network 41. In that case, high frequency signal cancellation in network 41 occurs when the signal gain exhibited by the compensation signal path including network 44 equals $A_{16}/A_{48}$, where the terms $A_{16}$ and $A_{48}$ correspond to the signal gains of amplifiers 16 and 48, respectively. This gain relationship permits the kinescope drive signal $(r_c-e_g)$ to be an amplified replica of the input signal (e.g., signal r), as discussed in connection with FIG. 1.

Figure 7:
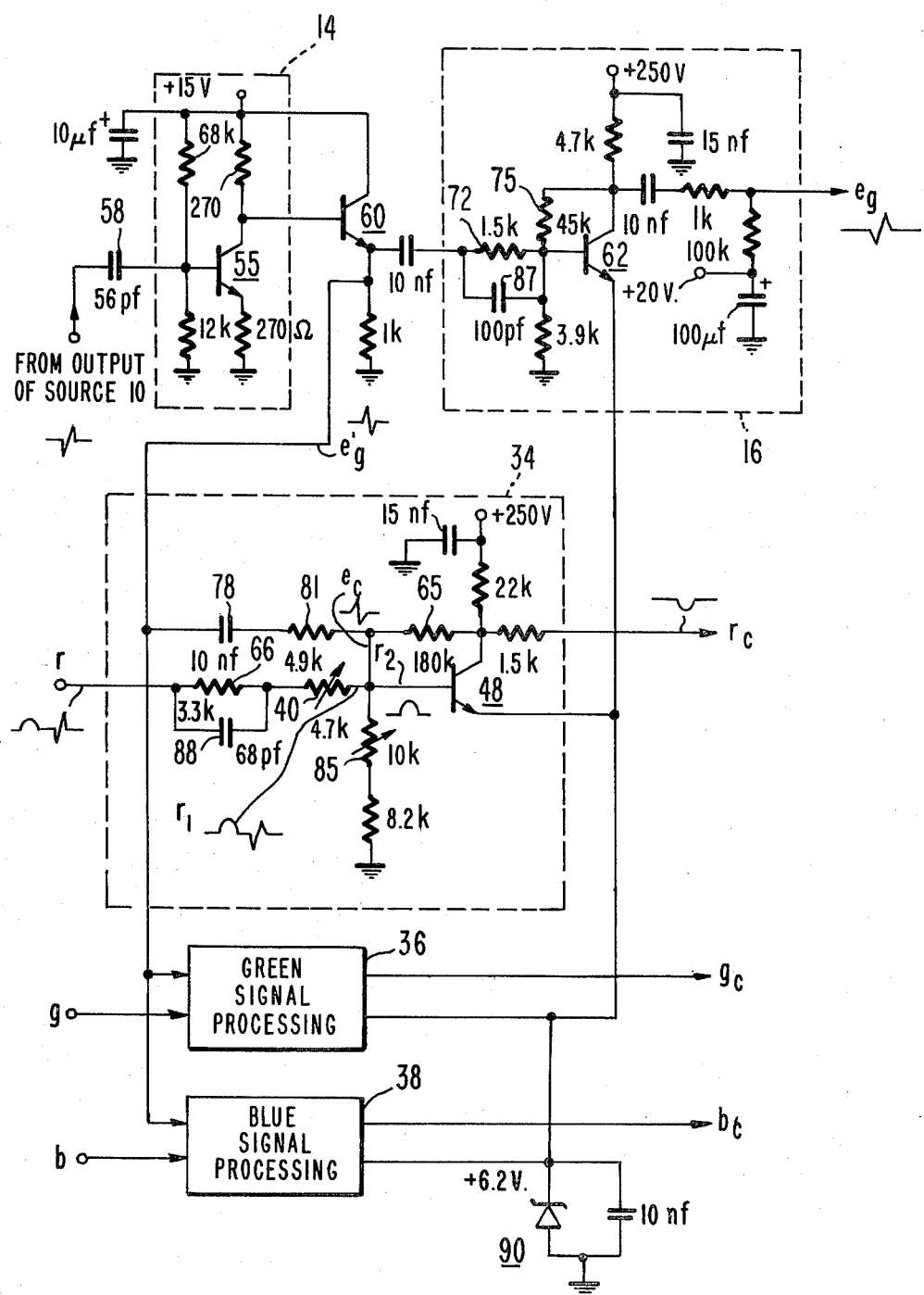
FIG. 7 illustrates details of another circuit constructed in accordance with the present invention.

FIG. 7 illustrates an alternate embodiment of pertinent portions of the arrangement of FIG. 1, wherein corresponding elements are identified by the same reference number. Since red, green and blue cathode signal processing networks 34, 36 and 38 are of similar configuration, only red signal processor 34 is shown in circuit form in FIG. 7.

In FIG. 7, an inverting amplifier stage comprising a transistor 55 corresponds to preamplifier 14 in FIG. 1. A capacitor 58 together with the input impedance of amplifier stage 14 corresponds to high pass filter 12 in FIG. 1. The high pass filter including capacitor 58 corresponds to a first order RC high pass filter with a cutoff frequency $f_c$ of 285 KHz, although different types of high pass filters with different cutoff frequencies can also be used.

A non-inverting emitter follower transistor 60 with a base input coupled to a collector output of transistor 55 drives grid signal amplifier stage 16 including a high voltage signal inverting amplifier transistor 62. A signal $e_g'$ from which compensation signal $e_c$ is derived is coupled from the emitter of follower transistor 60 to inputs of red, green and blue cathode signal processing networks 34, 36 and 38. It is noted that in this circuit, compensation signal $e_c$ is derived from the output of the preamplifier stage 14, rather than from the output of amplifier stage 16 as done in FIG. 1.

Network 34 includes a high voltage cathode amplifier transistor 48 biased for low current Class A operation. The network including transistor 48 provides signal inversion and exhibits a gain $A_{48}$ according to the expression:

$$A_{48} = R_{65}/(R_{66}+R_{40})$$

where $R_{65}$ and $R_{66}$ correspond to the values of resistors 65 and 66, and $R_{40}$ corresponds to the value of a variable "white balance" gain control resistor 40 employed during kinescope service set-up adjustment. When gain control resistor 40 is set to mid-range, gain $A_{48}$ is approximately equal to the gain of grid amplifier stage 16, the gain of which ($A_{16}$) is determined by the relationship:

$$A_{16}=R_{75}/R_{72}$$

where $R_{72}$ and $R_{75}$ correspond to the values of resistors 72 and 75, respectively. In this example, the ratio of gain $A_{16}$ to gain $A_{48}$ ($A_{16}/A_{48}$) is approximately unity when control 40 is at mid-range and determines the gain required of compensation network 44 to effect cancellation of the high frequency components when compensation signal $e_c$ and signal $r_1$ are combined at the base input of transistor 48. Thus, in FIG. 7 the signal path which provides compensation signal $e_c$ with unity signal gain comprises only a D.C. blocking capacitor 78 for coupling signal $e_c$ to the base of transistor 48.

Signal $r_1$ is combined with complementary phase compensation signal $e_c$ at the base of transistor 48 via summing resistors 66, 40 for signal $r_1$ and a summing resistor 81 for signal $e_c$. The values of these resistors are selected so that the amplitudes of complementary signals $r_1$ and $e_c$ are equal at the base of transistor 48 when gain control resistor 40 is set at mid-range, thereby causing the high frequency components of signal $r_1$ to cancel with high frequency signal $e_c$ at the base of transistor 48.

As with the arrangement of FIG. 1, the kinescope drive signal which determines the beam current of the red electron gun is directly proportional to and an amplified replica of red signal r, and there is no net modulation of the kinescope red electron gun by the high frequency signal from amplifier 16, for reasons analogous to those stated in connection with FIG. 1.

Amplifier stage 16 exhibits a normal video signal bandwidth ($-3$ db. at approximately 5 MHz) and a quiescent power dissipation of approximately 2.7 watts. In this example, the maximum power dissipation of transistor 48 is approximately 0.675 watts. A variable resistor 85 in the base input circuit of transistor 48 serves to adjust the D.C. operating point of red signal amplifier transistor 48 during serivce set-up adjustment of the kinescope, and in this example can adjust the D.C. output level of transistor 48 between approximately 120 and 170 volts. Capacitors 87 and 88 provide appropriate frequency compensation for stages 16 and 34, respectively. The grid signal processing path including amplifier stages 14 and 16 is A.C. coupled to permit stages 14, 16 and grid 18 to be biased for optimum performance. However, D.C. coupling can also be employed to provide appropriate bias in a given system.

The emitter electrodes of transistors 62 and 48 receive the same bias voltage of $+6.2$ volts from a bias network 90. In order to avoid changes in the black level of output signal $r_c$ with variations in the setting of gain control resistor 40, the black level voltage of input signal r is chosen to be approximately 6.9 volts (6.2 volts plus the 0.7 volt base-emitter junction offset voltage of transistor 48) so that substantially no signal current flows through gain control resistor 40 for black level signal conditions.

The arrangement of FIG. 7 advantageously requires only four high voltage transistors, three of which (transistor 48 and the corresponding amplifier transistors in networks 36 and 38) can be economical plastic types which do not require an external heatsink. A heatsink is required only for grid amplifier transistor 62. A wide bandwidth (5 MHz) as determined by high frequency amplifier transistor 62 is provided for all three kinescope electron guns, whereby high frequency differential rise time errors are essentially eliminated, since the high frequency components are processed by the grid circuits (e.g., amplifier 16) alone while the red, green and blue cathode driver amplifiers process only the low frequency components. The described circuit also exhibits low sensitivity to kinescope "flashovers" due to the low output impedance associated with Class A amplifiers employing voltage feedback. Moreover, video signal amplitude peaking control, if desired, need only be provided for grid amplifier stage 16 and not for each of the three cathode signal processing networks as with some other r, g, b video driver arrangements.

Although the signals supplied by source 10 correspond to luminance signals in the illustrated embodiments, it should be recognized that the signal supplied by source 10 can comprise any signal containing high frequency video signal components as discussed. Thus, for example, the signal from source 10 can be derived from the r, g, b signals individually or in combination.

The disclosed arrangement can also be employed with a kinescope of the type having plural grid electrodes each associated with a cathode electrode of the kinescope. In this instance, the grid electrodes would be energized in common by grid signal $e_g$ from grid driver 16.

What is claimed is:

1. In a system for processing a color image representative video signal containing low and high frequency components, said system including a kinescope having an electron gun assembly comprising first and second intensity control electrodes for reproducing an image in response to video signals applied to said electrodes, a kinescope driver amplifier arrangement comprising:
   means for passing selected high frequency components of said video signal above a given frequency;
   first amplifier means responsive to said selected high frequency components for supplying amplified, selected high frequency components to said first kinescope electrode;
   means for combining said selected high frequency components and said color representative video signal including said low and high frequency components, with a sense to significantily attenuate said high frequency component of said video signal at an output of said combining means; and
   second amplifier means responsive to output signals from said combining means for supplying amplified video signals to said second kinescope electrode.

2. An arrangement according to claim 1, wherein:
   said combining means combines said selected high frequency components and said color video signal with a sense to cancel said high frequency component of said color video signal at said output of said combining means.

3. An arrangement according to claim 1, and further comprising:
   means for adjustably controlling the amplitude of said color video signal combined by said combining means, said control means being adjustable to a position for producing a controlled amplitude color signal at an input of said combining means to cancel said selected high frequency components at said output of said combining means.

4. An arrangement according to claim 3, wherein:
   said means for passing selected high frequency components of said video signal comprises a high pass filter with a cut-off frequency corresponding to said given frequency.

5. In a system for processing a color image representative video signal containing low and high frequency components, said system including a kinescope having an electron gun assembly comprising first and second intensity control electrodes for reproducing an image in response to video signals applied to said electrodes, a kinescope driver amplifier arrangement comprising:
   a first signal processing path including
      means for passing selected high frequency components of said video signal above a given frequency; and
      first amplifier means responsive to said selected high frequency components for supplying amplified, selected high frequency components from an output to said first kinescope electrode;
   a second signal processing path having an input coupled to said output of said first amplifier means, and an output;
   a third signal processing path including signal combining means having an input for receiving high frequency signals from said output of said second path and having an input for receiving said color representative video signal including said low and high frequency components, for combining said color representative video signal with high frequency output signals from said first path with a sense to significantly attenuate said high frequency components of said video signal at an output of said combining means; and second amplifier means responsive to output signals from said combining means for supplying amplified video signals to said second kinescope electrode; and wherein said second signal path exhibits a signal gain substantially equal to the reciprocal of the signal gain of said third signal path between said output of said combining means and said kinescope electrode.

6. In a system for processing a color image representative video signal containing low and high frequency components, said system including a kinescope having an electron gun assembly comprising first and second intensity control electrodes for reproducing an image in response to video signals applied to said electrodes, a kinescope driver amplifier arrangement comprising:

a first signal processing path including
means for passing selected high frequency components of said video signal above a given frequency; and
first amplifier means responsive to said selected high frequency components for supplying amplified, a selected high frequency components from an output to said first kinescope electrode;

a second siganl processing path having an input coupled to an intermediate point in said first path between said selected frequency passing means and said first amplifier means, and an output;

a third signal processing path including
signal combining means having an input for receiving high frequency signals from said output of said second path and having an input for receiving said color representative video signal including said low and high frequency components, for combining said color representative video signal with high frequency output signals from said first path with a sense to significantly attenuate said high frequency components of said video signal at an output of said combining means; and
second amplifier means responsive to output signals from said combining means for supplying amplified video signals to said second kinescope electrode; and wherein said second signal path exhibits a signal gain substantially equal to the ratio of the signal gain between said intermediate point in said first path and said first kinescope electrode, to the signal gain between said output of said combining means and said second kinescope electrode.

7. In a color television receiver for processing a color image representative television signal containing low and high frequency components, said receiver including a kinescope having plural electron gun assemblies each comprising a cathode electrode and an associated grid electrode for reproducing an image in response to video signals applied to said electrodes; and means for deriving plural color image representative signals including said low and high frequency components from said television signal; a kinescope driver amplifier arrangement comprising:

means for passing selected high frequency components of said television signal above a given frequency;
amplifier means responsive to said selected high frequency components for supplying amplified, selected high frequency components to said grid electrode of said kinescope;
plural means for combining said selected high frequency components with each of said plural color representative signals including low and high frequency components, with a sense to significantly attenuate said high frequency component of each of said plural color signals at outputs of said plural combining means; and
plural amplifier means respectively responsive to output signals from said plural combining means, for supplying amplified color signals to said cathode electrodes of said kinescope, respectively.

8. An arrangement according to claim 7, wherein:
said grid electrode associated with each of said cathode electrodes corresponds to a single electrode common to each of said cathode electrodes of said kinescope.

9. An arrangement according to claim 7, wherein:
said grid electrode associated with each of said cathode electrodes corresponds to plural grid electrodes energized in common by said amplified, selected high frequency components.

10. An arrangement according to claim 7, wherein said receiver comprises:
means for deriving plural color difference signals and a luminance signal including said low and high frequency components from said color television signal;
means for combining said luminance signal and said color difference signals to produce said plural color signals including said low and high frequency components; and wherein
said selected high frequency components are derived from said luminance signal.

11. An arrangement according to claim 7, wherein said receiver further comprises:
plural means for respectively controlling the amplitudes of each of said plural color signals combined by said plural combining means.

12. In a color television receiver for processing a color image representative television signal containing low and high frequency components, said receiver including a kinescope having plural electron gun assemblies each comprising a cathode electrode and an associated grid electrode for reproducing an image in response to video signals applied to said electrodes; and means for deriving plural color image representative signals including said low and high frequency components from said television signal; a kinescope driver amplifier arrangement comprising:

means for passing selected high frequency components of said television signal above a given frequency;
means for coupling said selected high frequency components to said grid electrode with a given amplitude and phase;
plural means for deriving high frequency signals from said coupling means, and for coupling said derived high frequency signal to said cathode electrodes, respectively, with an amplitude and phase corresponding to the amplitude and phase of said high frequency components coupled to said grid electrode; and plural means for coupling said color signals including said low and high frequency components to said cathode electrodes, respectively, with a phase such that said high frequency components of said color signals and said derived high frequency signals are in phase opposition at each of said cathode electrodes.

13. An arrangement according to claim 12, wherein: said plural means for coupling said color signals each includes means for respectively controlling the amplitudes of color signals coupled to said cathodes, said control means being adjustable to produce a range of color signal amplitudes including an amplitude for causing said high frequency components of said color signals to cancel with said derived high frequency signals at each of said cathode electrodes.

* * * * *